(12) United States Patent
Wang et al.

(10) Patent No.: US 10,042,460 B2
(45) Date of Patent: Aug. 7, 2018

(54) DISPLAY DEVICE WITH FLEXIBLE CIRCUIT BOARD EXTENDED TO BE INTERPOSED BETWEEN LIGHT GUIDING FILM BUTTONS AND DISPLAY PANEL

(71) Applicants: BOE Technology Group Co., Ltd., Beijing (CN); Beijing BOE Optoelectronics Technology Co., Ltd., Beijing (CN)

(72) Inventors: Guangquan Wang, Beijing (CN); Zijian Wang, Beijing (CN); Yumei Chen, Beijing (CN); Zhanqing Cao, Beijing (CN); Fang Zhang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 157 days.

(21) Appl. No.: 14/892,627

(22) PCT Filed: Jun. 17, 2015

(86) PCT No.: PCT/CN2015/081639
§ 371 (c)(1),
(2) Date: Nov. 20, 2015

(87) PCT Pub. No.: WO2016/090884
PCT Pub. Date: Jun. 16, 2016

(65) Prior Publication Data
US 2016/0357311 A1    Dec. 8, 2016

(30) Foreign Application Priority Data
Dec. 12, 2014  (CN) .......................... 2014 2 0790709

(51) Int. Cl.
*G06F 3/041*    (2006.01)
*G02B 5/20*    (2006.01)
*F21V 8/00*    (2006.01)

(52) U.S. Cl.
CPC ........... *G06F 3/0416* (2013.01); *G02B 5/201* (2013.01); *G02B 6/0083* (2013.01); *G06F 3/0412* (2013.01); *G06F 2203/04102* (2013.01)

(58) Field of Classification Search
CPC ...... G06F 3/041; G06F 3/0412; G06F 3/0416; G06F 2203/04102; G06F 2203/04103;
(Continued)

(56) References Cited

U.S. PATENT DOCUMENTS

2009/0266696 A1    10/2009  Miyashita et al.
2010/0060601 A1*    3/2010  Oohira ................. G06F 3/0412
                                                            345/173

(Continued)

FOREIGN PATENT DOCUMENTS

CN    201985936 U    9/2011
CN    202422067 U    9/2012
(Continued)

OTHER PUBLICATIONS

Sep. 2, 2015—International Search Report and Written Opinion Appn PCT/CN2015/081639 with English Tran.

*Primary Examiner* — Nathan Danielsen
(74) *Attorney, Agent, or Firm* — Banner & Witcoff, Ltd.

(57) ABSTRACT

A display device, comprising a display panel with a touch control unit, a glass cover plate being positioned at a light emitting side of the display panel, and a light guiding film for buttons being positioned on a side of the glass cover plate facing to the display panel, and further comprising a first flexible circuit board extended to be interposed between the light guiding film for buttons and the display panel, provided (Continued)

with a functional module electrically connected with the light guiding film for buttons and a functional module electrically connected with the touch control unit. A functional module for providing signals to the light guiding film for buttons and a functional module for providing signals to the touch control unit are integrated into one flexible circuit board, so that a thickness of one layer of flexible circuit board is reduced in the thickness direction of the display device.

18 Claims, 1 Drawing Sheet

(58) Field of Classification Search
CPC .......... G09G 3/36–3/3696; G02B 5/20; G02B 5/201; G02B 6/0033; G02B 6/0058; G02B 6/006; G02B 6/0081; G02B 6/0083; G02B 6/0086–6/0091
See application file for complete search history.

(56) References Cited

U.S. PATENT DOCUMENTS

| | | | |
|---|---|---|---|
| 2011/0285640 A1* | 11/2011 | Park | G06F 3/0412 345/173 |
| 2013/0021297 A1* | 1/2013 | Lee | G06F 3/041 345/175 |
| 2014/0267948 A1* | 9/2014 | Bae | H03K 17/9631 349/12 |
| 2016/0342250 A1* | 11/2016 | Zhao | G06F 3/041 |

FOREIGN PATENT DOCUMENTS

| | | |
|---|---|---|
| CN | 203422720 U | 2/2014 |
| CN | 103927039 A | 7/2014 |
| CN | 104052450 A | 9/2014 |
| CN | 204242150 U | 4/2015 |

* cited by examiner

DISPLAY DEVICE WITH FLEXIBLE CIRCUIT BOARD EXTENDED TO BE INTERPOSED BETWEEN LIGHT GUIDING FILM BUTTONS AND DISPLAY PANEL

The application is a U.S. National Phase Entry of International Application No. PCT/CN2015/081639 filed on Jun. 17, 2015, designating the United States of America and claiming priority to Chinese Patent Application No. 201420790709.1 filed on Dec. 12, 2014. The present application claims priority to and the benefit of the above-identified applications and the above-identified applications are incorporated by reference herein in their entirety.

TECHNICAL FIELD

Embodiments of the present disclosure relate to a display device.

BACKGROUND

At present, touch display has become a prevailing technology in display devices.

A touch control unit is provided in a display device with touch display function. A plurality of button icons are displayed on a display side of the display device, and a button flexible circuit board has to be provided in the display device for picking up information of operations on the button icons and etc. Thus, a plurality of flexible circuit boards have to be provided in the display device, for example, a touch control flexible circuit board for providing signals to the touch control unit and a button flexible circuit board for providing signals to the button icons and so on.

However, there are many layers of flexible circuit boards in a thickness direction of the display device, which makes the thickness of the display device greater. This is adverse to a miniaturization design of the display device.

SUMMARY

At least one embodiment of the present disclosure provides a display device, comprising a display panel, a glass cover plate and a light guiding film for buttons, the display panel having a touch control unit, the glass cover plate being positioned at a light emitting side of the display panel, the light guiding film for buttons being positioned on a side of the glass cover plate facing to the display panel, wherein the display device further comprises a first flexible circuit board extended to be interposed between the light guiding film for buttons and the display panel, and the first flexible circuit board is provided with a functional module electrically connected with the light guiding film for buttons and a functional module electrically connected with the touch control unit.

In the above display device, a functional module for providing signals to the light guiding film for buttons and a functional module for providing signals to the touch control unit are integrated into one flexible circuit board, so that a thickness of one layer of flexible circuit board is reduced from the thickness direction of the display device, which benefits the miniaturization design of the display device.

In one embodiment of the present disclosure, the display panel comprises an array substrate and a color filter substrate. The color filter substrate is positioned between the array substrate and the glass cover plate. The first flexible circuit board is positioned between the color filter substrate and the light guiding film for buttons.

In one embodiment of the present disclosure, a detecting polarizer is disposed on a side of the color filter substrate away from the array substrate. The detecting polarizer is bonded to the glass cover plate by bonding glue.

In one embodiment of the present disclosure, the bonding glue is OCA glue.

In one embodiment of the present disclosure, a driving unit and a driving circuit are disposed at peripheries of the array substrate.

In one embodiment of the present disclosure, the display device further comprises a second flexible circuit board electrically connected with the driving circuit.

In one embodiment of the present disclosure, the display device further comprises a backlight module positioned at a light incident side of the display panel, one end of the first flexible circuit board is bent to a side of the backlight module away from the display panel.

In one embodiment of the present disclosure, the display device further comprises a backlight module positioned at a light incident side of the display panel, one end of the second flexible circuit board is bent to a side of the backlight module away from the display panel.

In one embodiment of the present disclosure, the touch control unit is an embedded touch control unit.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
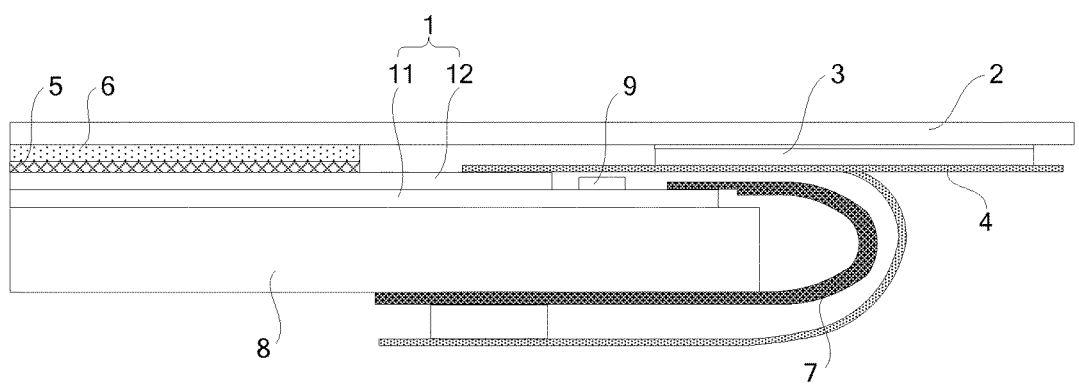
FIG. 1 is an illustrative structural view of a display device according to an embodiment of the present disclosure.
Figure 2:
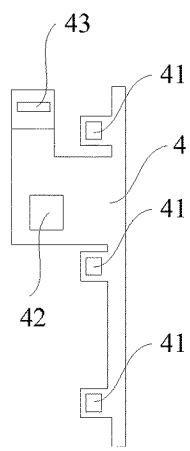
FIG. 2 is an illustrative structural view of a first flexible circuit board in the display device according to the embodiment of the present disclosure.

Reference is made to FIG. 1 and FIG. 2. As illustrated in FIG. 1, a display device according to one embodiment of the present disclosure comprises a display panel 1 with a touch control unit, a glass cover plate 2 positioned on a light emitting side of the display panel 1, a light guiding film for buttons 3 positioned on a side of the glass cover plate 2 facing to the display panel 1, and further comprises a first flexible circuit board 4 extended to be interposed between the light guiding film for buttons 3 and the display panel 1. As illustrated in FIG. 2, the first flexible circuit board 4 is provided with a functional module 41 electrically connected with the light guiding film for buttons 3 and a functional module 42 electrically connected with the touch control unit.

In the above display device, a functional module for providing signals to the light guiding film for buttons and a functional module for providing signals to the touch control unit are integrated into the first flexible circuit board 4, so that a thickness of one layer of flexible circuit board is reduced in the thickness direction of the display device, which benefits the miniaturization design of the display device.

Of course, as illustrated in FIG. 2, the first flexible circuit board 4 is further provided thereon with a connection terminal 43 for connecting with external circuit boards.

Referring back to FIG. 1, in one embodiment of the present disclosure, the display panel 1 comprises an array substrate 11 and a color filter substrate 12. The first flexible circuit board 4 is positioned between the color filter substrate 12 and the light guiding film for buttons 3.

In one embodiment of the present disclosure, as illustrated in FIG. 1, a detecting polarizer 5 is disposed on a side of the color filter substrate 12 away from the array substrate 11. The detecting polarizer 5 and the glass cover plate 2 are bonded by bonding glue 6 therebetween which is made of transparent materials. Bonding glue made of transparent materials is fully filled between the glass cover plate 2 and the detecting polarizer 5, having the detecting polarizer 5 and the glass cover plate 2 bonded, thus not only ensuring the light extracting rate on the light emitting side of the display device, but also improving the bonding stability between the glass cover plate 2 and the detecting polarizer 5.

In one embodiment of the present disclosure, the above-described bonding glue can be OCA glue. The OCA glue is a adhesive dedicated for bonding transparent optical elements. It has high light transmittance and good bonding strength as well as a small shrinkage after bonding, and thus the product quality of the display device can be improved.

In one embodiment of the present disclosure, as illustrated in FIG. 1, in the above display device, a driving unit 9 and a driving circuit are disposed at peripheries of the array substrate 11.

In one embodiment of the present disclosure, as illustrated in FIG. 1, the above display device further comprises a second flexible circuit board 7 electrically connected with the driving circuit. The portion where the second flexible circuit board 7 and the array substrate 11 are connected is positioned at an edge portion of the array substrate 11 extending outside the color filter substrate 12, so that an electrical connection with the driving circuit can be achieved without increasing the thickness of the display device, which benefits the miniaturization design of the display device.

In one embodiment, as illustrated in FIG. 1, the above display device further comprises a backlight module 8 positioned at a light incident side of the display panel 1. One end of the first flexible circuit board 4 is bent to a side of the backlight assembly 8 away from the display panel 1.

On the basis of the above various embodiments, for example, the touch control unit is an embedded touch control unit.

The thickness of the display panel 1 can be further reduced by configure the touch control unit of the display panel 1 in the above display device to be an embedded touch control unit, so that it is more advantageous for the miniaturization design of the display device.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201420790709.1 filed on Dec. 12, 2014, the disclosure of which is hereby entirely incorporated by reference.

The Invention claimed is:

1. A display device, comprising a display panel, a glass cover plate and a light guiding film for buttons, the display panel having a touch control unit, the glass cover plate being positioned at a light emitting side of the display panel, the light guiding film for buttons being positioned on a side of the glass cover plate facing to the display panel, wherein the display device further comprises a first flexible circuit board extended to be interposed between the light guiding film for buttons and the display panel and being in contact with the display panel, and the first flexible circuit board is provided with a functional module electrically connected with the light guiding film for buttons and a functional module electrically connected with the touch control unit.

2. The display device according to claim 1, wherein the display panel comprises an array substrate and a color filter substrate, the color filter substrate is disposed between the array substrate and the glass cover plate, and the first flexible circuit board is disposed between the color filter substrate and the light guiding film for buttons.

3. The display device according to claim 2, wherein a detecting polarizer is disposed on a side of the color filter substrate away from the array substrate, and the detecting polarizer is bonded to the glass cover plate by bonding glue.

4. The display device according to claim 3, wherein the bonding glue is OCA glue.

5. The display device according to claim 4, wherein a driving unit and a driving circuit are disposed at peripheries of the array substrate.

6. The display device according to claim 5, further comprising a second flexible circuit board electrically connected with the driving circuit.

7. The display device according to claim 4, further comprising a backlight module positioned at a light incident side of the display panel, and one end of the first flexible circuit board is bent to a side of the backlight module away from the display panel.

8. The display device according to claim 3, wherein a driving unit and a driving circuit are disposed at peripheries of the array substrate.

9. The display device according to claim 8, further comprising a second flexible circuit board electrically connected with the driving circuit.

10. The display device according to claim 3, further comprising a backlight module positioned at a light incident side of the display panel, and one end of the first flexible circuit board is bent to a side of the backlight module away from the display panel.

11. The display device according to claim 2, wherein a driving unit and a driving circuit are disposed at peripheries of the array substrate.

12. The display device according to claim 11, further comprising a second flexible circuit board electrically connected with the driving circuit.

13. The display device according to claim 2, further comprising a backlight module positioned at a light incident side of the display panel, and one end of the first flexible circuit board is bent to a side of the backlight module away from the display panel.

14. The display device according to claim 1, wherein a driving unit and a driving circuit are disposed at peripheries of the array substrate.

15. The display device according to claim 14, further comprising a second flexible circuit board electrically connected with the driving circuit.

16. The display device according to claim 15, further comprising a backlight module positioned at a light incident side of the display panel, one end of the second flexible circuit board is bent to a side of the backlight module away from the display panel.

17. The display device according to claim 1, further comprising a backlight module positioned at a light incident side of the display panel, and one end of the first flexible circuit board is bent to a side of the backlight module away from the display panel.

18. The display device according to claim 1, wherein the touch control unit is an embedded touch control unit.

* * * * *